(12) United States Patent
Abad-Peiro et al.

(10) Patent No.: US 8,468,089 B1
(45) Date of Patent: Jun. 18, 2013

(54) METHOD OF IMPROVING SECURITY IN ELECTRONIC TRANSACTIONS

(75) Inventors: Jose-Luis Abad-Peiro, St-Georges-Commiers (FR); Stolze Markus, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/787,753

(22) PCT Filed: Sep. 2, 1999

(86) PCT No.: PCT/IB99/01494
§ 371 (c)(1),
(2), (4) Date: Jun. 11, 2001

(87) PCT Pub. No.: WO00/17834
PCT Pub. Date: Mar. 30, 2000

(30) Foreign Application Priority Data

Sep. 21, 1998 (EP) .................................. 98117856

(51) Int. Cl.
*G06Q 40/00* (2012.01)
(52) U.S. Cl.
USPC ........... 705/39; 705/35; 705/64; 902/1; 902/2
(58) Field of Classification Search
USPC ................... 705/35, 39, 64; 902/1, 2
See application file for complete search history.

(56) References Cited

U.S. PATENT DOCUMENTS

| | | | |
|---|---|---|---|
| 4,799,156 A * | 1/1989 | Shavit et al. | 705/26.3 |
| 5,557,518 A * | 9/1996 | Rosen | 705/69 |
| 5,592,375 A | 1/1997 | Salmon et al. | |
| 5,671,280 A * | 9/1997 | Rosen | 705/67 |
| 5,809,144 A * | 9/1998 | Sirbu et al. | 705/53 |
| 5,889,863 A * | 3/1999 | Weber | 705/76 |
| 5,937,394 A * | 8/1999 | Wong et al. | 705/26 |
| 5,956,699 A * | 9/1999 | Wong et al. | 705/39 |
| 5,987,132 A * | 11/1999 | Rowney | 705/77 |
| 5,987,140 A * | 11/1999 | Rowney et al. | 705/79 |
| 6,016,484 A * | 1/2000 | Williams et al. | 705/39 |

(Continued)

FOREIGN PATENT DOCUMENTS

| | | | |
|---|---|---|---|
| EP | 822535 A2 * | 2/1998 | |
| EP | 854462 A2 * | 7/1998 | |

(Continued)

OTHER PUBLICATIONS

O'Mahony et al, Electronic Payment Systems, Artech House, 1997, pp. 101-123.*

(Continued)

*Primary Examiner* — Muriel Tinkler
(74) *Attorney, Agent, or Firm* — Ference & Associates LLC (57) ABSTRACT

A computerized method (10) is provided which improves data security in electronic transactions in an insecure network (12). This is accomplished when the method (10) operates on a user (18) which has established a commercial relationship with a trusted third party broker (22), and merchants (20a-20d). The method utilizes network links (14, 24) between (a) the trusted third party broker and the user and (b) the trusted third party broker and the merchants. Protocols are selected to operate between each network link, the selection being made, at least in part, on the basis of the computer resources which may be expected to be available in each network link.

17 Claims, 8 Drawing Sheets

U.S. PATENT DOCUMENTS

| | | | | |
|---|---|---|---|---|
| 6,026,379 | A | * | 2/2000 | Haller et al. ............... 705/34 |
| 6,029,150 | A | * | 2/2000 | Kravitz ...................... 705/39 |
| 6,078,902 | A | * | 6/2000 | Schenkler .................. 705/35 |
| 6,138,107 | A | * | 10/2000 | Elgamal ..................... 705/39 |
| 6,233,565 | B1 | * | 5/2001 | Lewis et al. ................ 705/35 |
| 6,356,878 | B1 | * | 3/2002 | Walker et al. .......... 705/26.81 |
| 6,502,122 | B1 | * | 12/2002 | Takeuchi .................. 718/101 |
| 6,539,379 | B1 | * | 3/2003 | Vora et al. .................... 707/6 |
| 6,553,346 | B1 | * | 4/2003 | Walker et al. .......... 705/26.35 |
| 2002/0099609 | A1 | * | 7/2002 | Nascenzi et al. ........... 705/21 |
| 2002/0169712 | A1 | * | 11/2002 | Ginzboorg et al. ......... 705/39 |

FOREIGN PATENT DOCUMENTS

| | | |
|---|---|---|
| EP | 0 822 535 A2 * | 8/1998 |
| EP | 0 854 462 A2 * | 11/1998 |
| JP | H10-74221 | 3/1989 |
| WO | WO97/41539 | 11/1997 |
| WO | WO98/30985 | 7/1998 |
| WO | WO98/40809 | 9/1998 |

OTHER PUBLICATIONS

Garrett Michael Hayes. E-commerce gets easier. Computerworld. Aug. 3, 1998;32(31): 62-65. In: ABI/INFORM Global [database on the Internet] [cited Mar. 21, 2011]. Available from: http://www.proquest.com/; Document ID: 32577689.*

Edwin Powell. Electronic commerce: Web-based businesses are booming. Office Systems. Sep. 1, 1998;15(9): 12-15. In: ABI/INFORM Global [database on the Internet] [cited Mar. 21, 2011]. Available from: http://www.proquest.com/; Document ID: 34467683.*

Scott J Takacs, Jon B Freiden. Changes on the electronic frontier: Growth and opportunity of the World-Wide Web. Journal of Marketing Theory and Practice. Jul. 1, 1998;6(3): 24-37. In: ABI/INFORM Global [database on the Internet] [cited Mar. 21, 2011]. Available from: http://www.proquest.com/; Document ID: 38942761.*

* cited by examiner

| Auto Quotations | | | | | |
|---|---|---|---|---|---|
| Feature | Const | Top Comp (20a) | Ice Comp (20b) | Ice TP++ (20c) | Ice TP (20d) |
| Price | | 400 | 535 | 335 | 235 |
| Match | | | | | |
| 3rd Party Liability | | + | + | + | + |
| Fire Coverage | | +/+ | +/- | +/- | - |
| Theft Coverage | | +/+ | +/- | +/- | - |
| Accidental Damage Cover | | + | + | - | - |
| Accident Assistance | | +/- | +/35 | +/35 | +/35 |
| 24 Hour Help Line | | + | + | + | + |
| Free Courtesy Car Duri | | - | + | + | + |
| Transport Home After | | - | + | +/- | - |
| Free EU Car Hire Durin | S | + | 35 | 35 | 35 |
| 3-Year Guaranteed Re | | + | + | + | + |
| Breakdown Assistance | | 20/- | 30/35/- | 30/35/- | 30/35/- |
| Domestic Assistance | | 20/- | 30/- | 30/- | 30/- |
| EU Assistance | | - | EU:35 | EU:35 | EU:35 |
| Legal Assistance | | +/- | 20/- | 20/- | 20/- |
| Windscreen Coverage | | +/- | +/- | - | - |
| Window Security Etching | | +/- | - | +/- | - |
| Claims Handling | | +/- | +/30/- | - | - |
| Discounts | | + | - | - | - |

Sort by Price | Set Feature Constraint | Sort by Feature | Buy Offer (114)

METHOD OF IMPROVING SECURITY IN ELECTRONIC TRANSACTIONS

BACKGROUND OF THE INVENTION

This invention relates to methods of improving security in transacting electronic commerce. More specifically, the invention defines a framework which enables trusted brokers running in an insecure network such as the Internet to offer more secure payment facilities.

Electronic commerce is based on the electronic exchange of items, one of the typical exchanges is an electronic payment but it may also be a digitally signed contract. An important requirement for security in the exchange of items is fairness. An exchange is fair if, at the end of the transaction, either party receives the item he expected, neither party receives it, or each party obtains a legally binding receipt of the transaction which can be submitted to a third party for resolution, in the event that the received item does not meet expectations. At present, such commerce is typically conducted directly between a user and a merchant (of course, with the intervention of a bank in obtaining payment), representing a direct point-to-point contact on the Internet. In the context of electronic commerce, transactions or exchanges may be carried out over insecure networks. Unfortunately, it is possible for a hacker to exploit vulnerabilities in protocols and applications or to corrupt systems used by the other party. Therefore, carefully designed exchange protocols are used to help guarantee security in electronic commerce transactions. The Secure Socket Layer or "SSL" secure communication protocol, introduced by Netscape in 1994, is an example of such a protocol. This protocol provides encryption and authentication between web browsers and servers, such as between users and merchants, and is characterized by requiring very little processing power to utilize. SSL is commonly used for sending encrypted credit card numbers over the Internet. A substantially more secure payment protocol, requiring significantly greater computing power, was introduced by Mastercard, VISA, and others in February, 1996 (upgraded in June, 1996). This protocol is known as the Secure Electronic Transaction or "SET" protocol. Its purpose is to provide confidentiality of information, ensure payment integrity, and authenticate both merchants and cardholders. The current computing requirements for implementing the SET protocol make it inappropriate as a protocol for shopper/users to run directly from their browser. If such were used by the user, for example, in downloading an applet, downloading times and performance losses would likely increase to unacceptable levels.

Further, unless the user has some mechanism of fair exchange, the user must trust the merchant, an entity with whom the user may not have had dealings and about which he is only able to obtain information from the merchant himself. The justifiable lack of trust in a merchant-server's self certification (e.g., the fear of merchant fraud) tends to limit the growth and acceptability of electronic commerce. Therefore, even when organizations use the SET protocol to perform payment functions, the user's lack of anonymity is a disadvantage.

The prior art describes various attempts at improving security. These attempted solutions fall into two categories: (1) third party protocols which make use of a trusted, on-line third party who is typically registered as such by a neutral entity, and (2) gradual exchange protocols in which the probability of obtaining a fair exchange is gradually increased over several rounds of communications. In common commercial terms, this latter protocol is comparable to a "course of dealing" between the parties involved in the exchange. In the trusted third party approach, organizations managing a trusted third party must conform to a number of requirements. For example, a trusted third party may be required to (1) meet minimum financial criteria, (2) to possess insurance against fraud, and (3) be socially credible. Proper adherence to and implementation of these requirements ensures that information disclosed by users to a trusted third party is handled in a secure manner.

In U.S. Pat. No. 5,592,375 a system for brokering goods or services between buyers and sellers is described whereby the buyer is provided an aid in selecting among the variety of products. The buyer and the seller are connected to computers via a brokering system including a database, a customers interface and a buyers interface. The buyers interface provides a knowledge based interactive protocol enabling the buyer to select and review the respective information from the database. The session between the buyer and his client is rendered secure by using the identification of the buyer and some security information. The system can be particularly used for assisting an employer in hiring. EP A 0854 462 discloses a system with a broker server which is arranged in between a customer and a merchant and a method of trading in two steps including sending electronic money from the consumer to broker's server and from the brokers, to the merchant. Cryptography maybe used to transmit and receive data for achieving confidence and authentication.

The prior art solutions have shortcomings. For example, the third party method runs the risk of the third party becoming a bottleneck due to the fact that a single trusted third party may be asked to serve as such in a number of widely varying transactions.

Alternate fair-exchange protocols involve the use of third party servers in exceptional circumstances, such as in the case of disputes. For example, both parties agree on the items to be exchanged and which third party to use in case of an exception. This is known as the optimistic approach to using a third party. Only the risk-taking party (the originator) may invoke the third party (due to the customer being unsatisfied with the bought merchandise). The merchant may also complain as well (e.g., regarding an invalid check). Thus, this method helps overcome the traditional risk of the trusted third party becoming a bottle neck, but limits the recourse of the other party. Other approaches have used an overall time limit parameter which ensures that, should the risk-taking party not invoke the third party, the other party will be able to resolve the transaction.

Other methods have been developed with varying degrees of effectiveness. Most either lack sufficient effectiveness, do not provide anonymity, or require substantial processing time or processing power on the part of the parties involved.

Therefore, what is needed is a method of improving the security of an electronic exchange (with both fair exchange and anonymity of the user) which does not require excessive processor time or increase the hardware requirements of the user.

SUMMARY OF THE INVENTION

A computerized method of transacting electronic commerce in an insecure network is provided which improves data security in the insecure network. The method operates on and between a user which has established a commercial relationship with a trusted third party, and merchants. The method utilizes network links between (1) the user and the trusted third party broker and (2) the trusted third party broker and the merchants. The method further utilizes protocols which are selected, at least in part, on the basis of the computer resources which may be expected to be available in each network link. Applying this method, a user can use a protocol requiring less computer resources than those required by SET, but at the same time, maintaining acceptable security levels through the use of the SET protocol by the trusted third party broker.

In a feature of the invention, the computerized method includes the steps of (a) permitting the user, using a browser and a low resource-intensive protocol to access the trusted third party broker in order to request broker services; (b) the trusted third party broker gathering information from web servers of the merchants offering competitive products which the broker believes may satisfy the user's request; (c) the browser presenting an interactive window to the user which allows the user to compare differences between the competitive products and choose between the competitive products; (d) the user choosing between the competitive products, thus selecting a merchant and issuing a payment order through the trusted third party broker for the benefit of the merchant; (e) the trusted third party broker transmitting the payment order to the merchant using a highly secure payment protocol, thus paying the merchant on behalf of the user; and (f) the merchant and a bank cooperating using, for example, the SET protocol, enabling the merchant to securely receive payment from the bank.

In another feature of the invention, the computerized method has the additional step of providing confirmation of payment on the payment order to the user.

In another feature of the invention, the browser is JAVA-enabled and the interactive window is an applet utilizing CGI technology.

An object of the invention is to provide support for fair exchange and anonymity of the user with respect to the merchant.

Another object of the invention is to provide an efficient and secure means of permitting electronic commerce in products which traditionally have not been available electronically, such as insurance products.

Another object of the invention is to provide a means for users of Personal Digital Assistants ("PDAs"), mobile phones, or hand-held computers to use such devices to more securely transact electronic commerce.

Another object of the invention is to permit the transaction of electronic commerce with maximum security (given available computer resources) within a commercially acceptable time frame.

DETAILED DESCRIPTION OF THE PREFERRED EMBODIMENT

Figure 1:
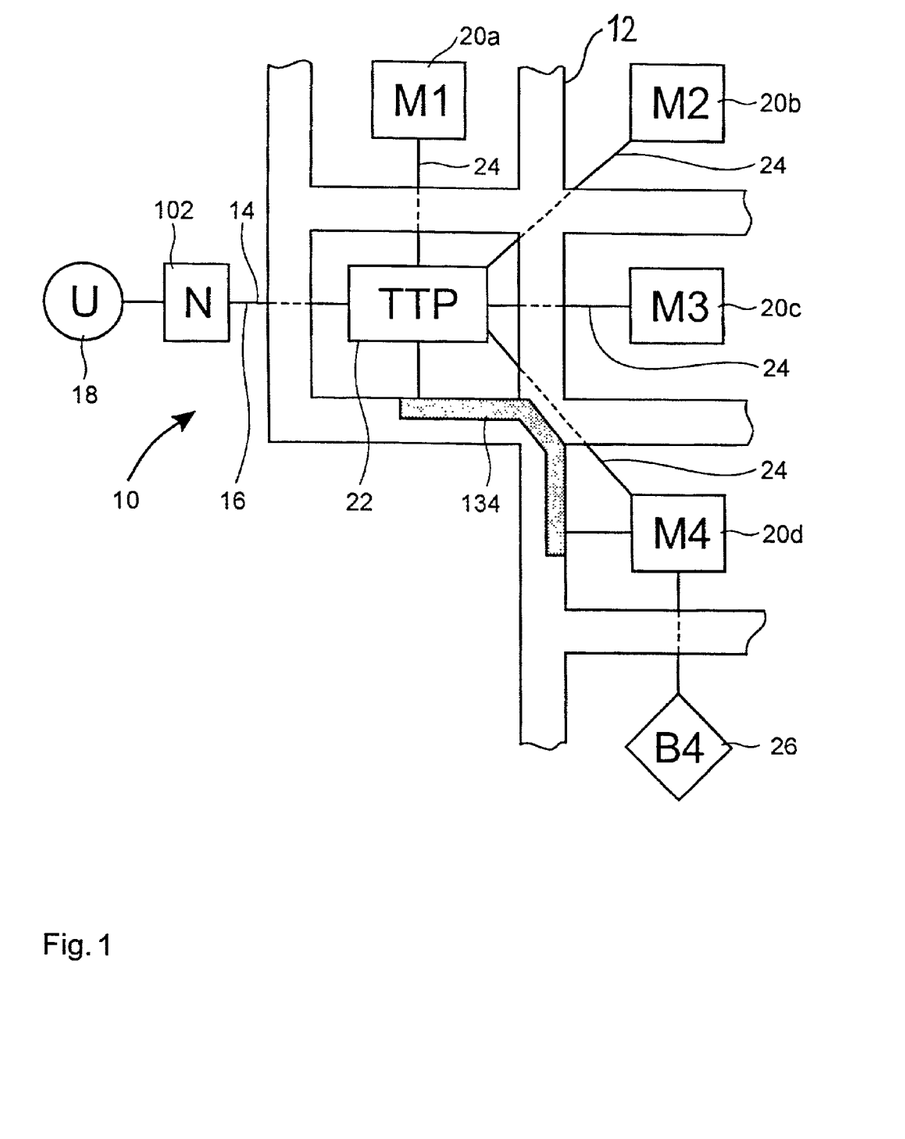
FIG. 1 is a block diagram of the method of the invention.

As shown in FIG. 1, a computerized method 10 of improving data security in electronic commerce transacted in an insecure network 12 is provided. The method 10 is particularly suited to network connections 14 (shown in solid and dashed lines) having limited computing resources such as on a user side 16, the side of the network connection to which a user or client 18 connects.

In an insurance context, representing a first embodiment of the invention, the method 10 operates on and between merchants 20a-20d who sell insurance and a user 18 which has established a commercial relationship with a trusted third party broker ("TTP") 22 of insurance policies (i.e., an insurance broker). The commercial relationship is established by the user 18 at least to the extent that the user is aware that he is making a payment which will be redirected by the TTP 22. The TTP 22 is a trusted server which receives and processes requests for information about products or services, such as insurance policies, on the insecure network 12 such as the Internet. The method 10 achieves improved security in payments by splitting the payment into two parts: (1) that associated with the network link 14 between the user 18 and the TTP 22, and (2) that associated with the network link 24 between the TTP and the merchants 20a-20d. The method 10 utilizes protocols which are selected, at least in part, on the basis of the computer resources which may be expected to be available in each network link 14 and 24.

Because computing resources on the user side 16 of the network link 14 between the user 18 and the TTP 22 are generally limited, the SSL protocol is used. SSL is a simple protocol which does not require extraordinary computing resources of the user 18. Although the user 18 cannot use the non-repudiation features that otherwise would be available for use with the SET protocol, the user can assure himself of security by verifying the authenticity of the TTP 22, thus increasing his level of trust in the server of the TTP.

Because computing resources between the TTP 22 and the merchant 20a, 20b, 20c, or 20d are generally greater than those available on the user side 16, the SET protocol is used to direct user payments through a server of an appropriate merchant server, e.g., merchant 20d, and to secure the transaction between the merchant server and its bank 26. This helps assure the user 18 that payments made by the TTP 22 on his or her behalf will be made with a very high level of security. Further, because the transaction is made through the TTP 22, the identify of the user 18 need not be revealed to the merchant 20d, thus making the transaction untraceable against observers and providing anonymity (with respect to the merchant) in the payment transaction for the user as well. Thus, only the TTP 22 need know the identity of the user 18.

The additional security features of user anonymity and untraceability against observers are advantageously utilized in another context, that of an employment search. In this context, the TTP 22 is the employment service or executive search firm, certified by a certification authority, and the merchants 20a-20d are the prospective employers. The anonymity and untraceability features are advantageous in job searching where many job-seeker users 18 may wish to remain anonymous until an employment contract is signed. The process of the user 18 sending a payment order as described above is analogous to the job-seeker user sending a CV or resume to a prospective employer. The job-seeker user 18 will send his CV to the TTP 22 through a secure channel using the SSL protocol. The CV will not indicate identifying information of the job-seeker user 18, such as his name, address, or current place of employment. Thus, negotiations can take place between the three parties while maintaining anonymity of some of the details of the job-seeker user 18. The TTP 22 then matches the requirements of employers and job-seeker users 18. Once the match takes place, either the job-seeker user 18 or an employer-"merchant" 20d will perform a SET payment to the TTP 22 for the service. It should be noted that in this case, a SET payment is made to the TTP 22. This is different from that of the insurance context described above in which the user 18 makes payment to the merchant 20d through the TTP 22.

In a feature of the invention, a mechanism which enables browsers to verify the "trustiness" of the server is added, thus providing users 18 with a means of verifying that a server of a TTP 22 which claims to be a trusted server is, in fact, trusted. This is accomplished by displaying a unique identifying icon (not shown) when certificates of certain types are received. The identifying icon is registered with a certification authority who is responsible for identifying infringers and maintaining the integrity of the icon. In addition, the TTP 22 itself may serve as a secondary certification authority. The TTP 22 accomplishes this secondary certification role in part by maintaining a list of infringers, merchants 20a-20d, and users 18 which have previously misbehaved, e.g., those who have not fulfilled an agreement established after a dispute was resolved. When a particular user 18 (or merchant 20d in the employment search context) is involved in a transaction, the TTP 22 is able to recognize the user's (or merchant's) signature and then mark the signature with an icon, thus maintaining the anonymity of the payor.

Figure 2:
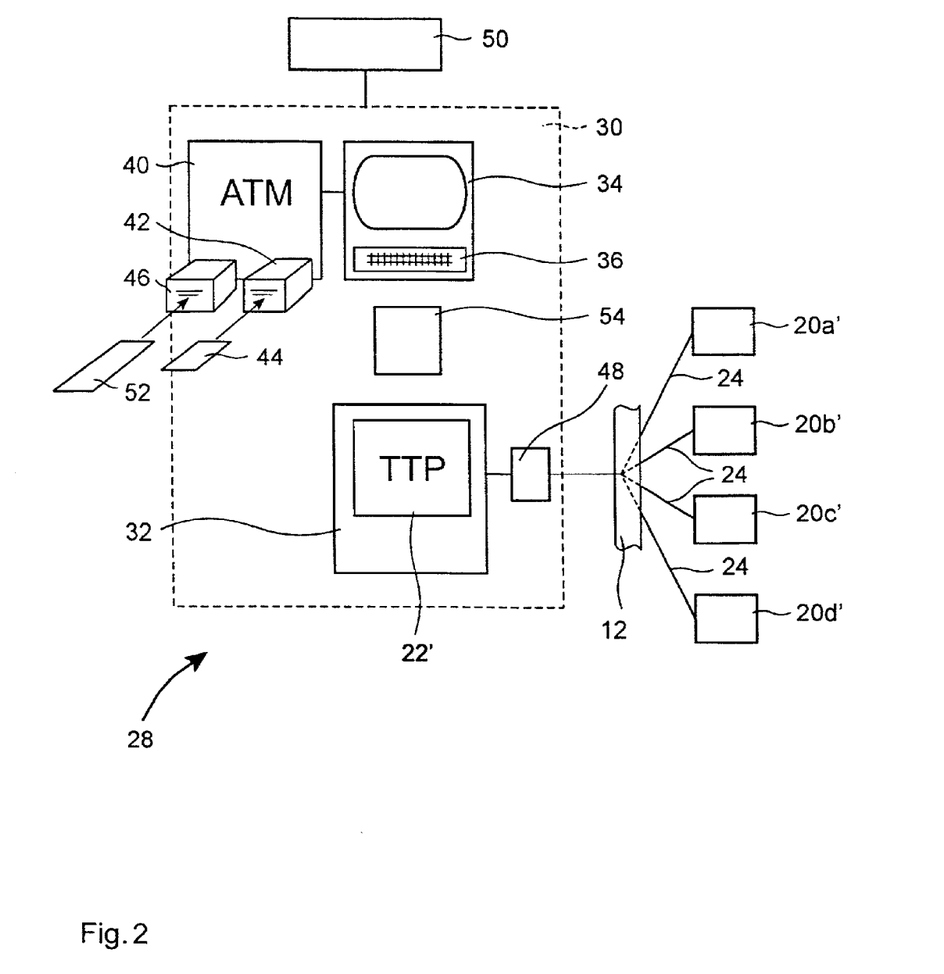
FIG. 2 is a block diagram of the method of the invention applied in the context of vending travel insurance.
Figure 4:
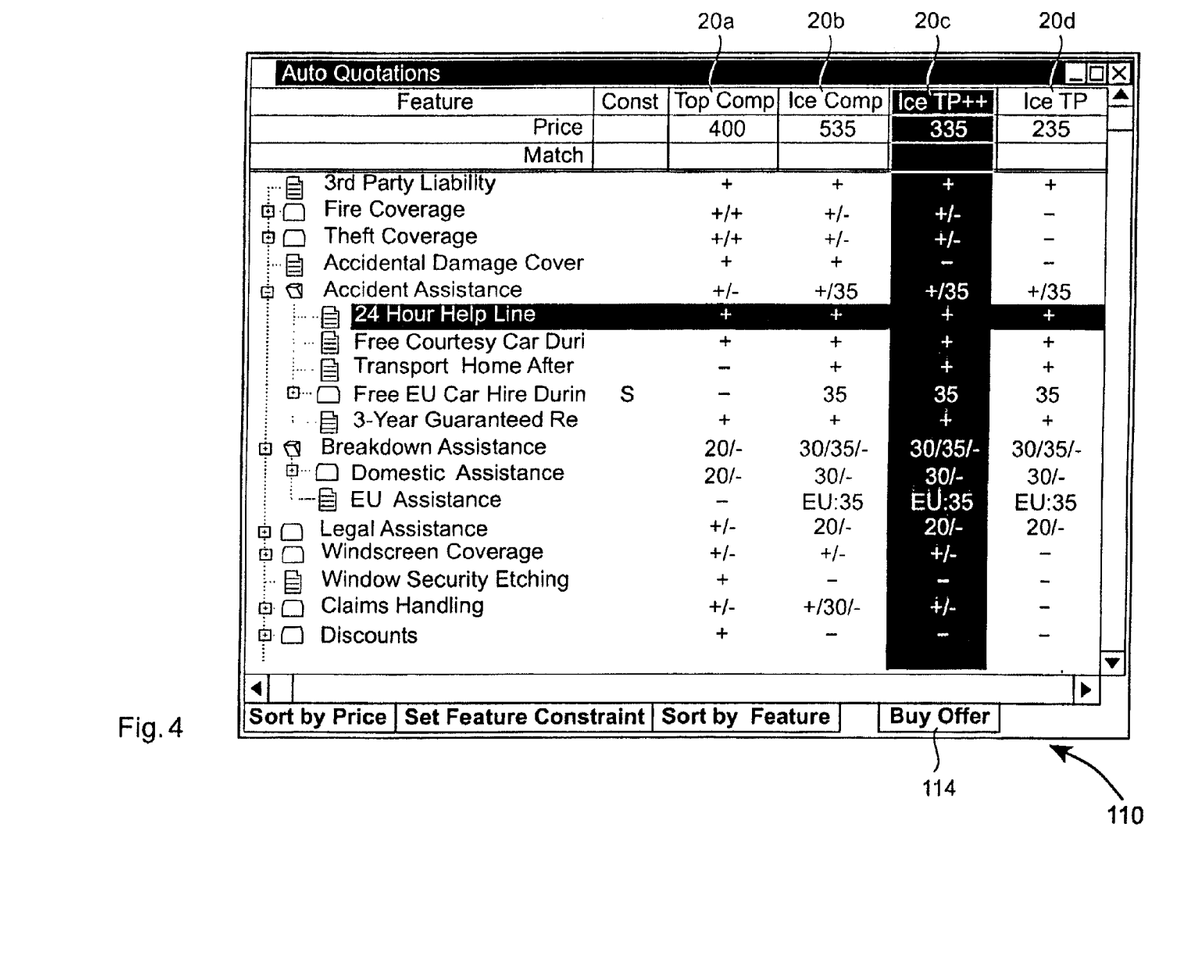
FIG. 4 is a layout view of an interactive user interface of the method of the invention, applied in the context of vending auto insurance.

In an alternate embodiment of the invention, as depicted in FIG. 2, a TTP 22' is resident in a local machine 28 with which a user 18 directly and physically interfaces. The machine 28 includes a housing 30 enclosing a server 32 loaded with data and software necessary to enable the server to act as a TTP 22'; an X-terminal 34 including a keyboard 36, the X-terminal communicating with the server, optionally, an Automated Teller Machine subsystem ("ATM") 40 having a card reader 42 to receive and process payments made with a bank card or SMART CARD 44 and a flight ticket reader 46; and a network device 48 which connects the server to the Internet or other non-private or semi-private network 12. This machine 28 is particularly applicable for use as a travel insurance machine at an airport, where the merchants are insurance companies 20a'-20d', the TTP 22' is an insurance broker, and the product is the travel insurance policy. Note that an insurance policy is also widely considered a service. Therefore, the term "product" as used throughout this specification is interchangeable with the term "service" and should not be construed as limiting. This machine 28 thus enables traveller-users 18 to purchase insurance products prior to boarding an airplane. Further, because of its physical characteristics, this machine 28 may be accompanied by a physical visual device such as a sign 50 to attract the attention of passers-by. Traveller-users 18 may introduce a machine-readable flight ticket 52 into the reader 46 and, for example, the SMARTCARD 44 in the reader 42, of the ATM 40. The ATM 40 reads the flight details from the ticket 52 and presents a list of insurance policies and services corresponding to the user's flight using a multimedia browser. Note that an example of a multimedia browser/interactive user interface 110 is shown in FIG. 4, in the context of vending automobile insurance. Once the traveller-user 18 decides to buy such a product, a digitally signed statement from the selected insurance merchant 20d' is stored in the SMARTCARD 44 (or in the TTP 22' in case of using a flight ticket 52 alone), and a payment to the insurance merchant is performed over the network 12. Use of the machine 28 in this closed system is advantageous because, where the X-terminal 34 interacts with a browser 54, the user 18 may utilize (1) SSL locally between an X-terminal input or the browser and the TTP 22', even if both are in the same machine, and receive anonymity through the use of the TTP, and (2) SET between the TTP and the selected insurance merchant 20d'. It should be noted that even when the system appears closed, a hacker may still have been able to introduce a virus or a splice which can attack or intercept communications on either network link 12 or 24; therefore, all intra-process communications are encrypted. Further, the machine 28 can optionally be utilized for enabling the traveller-user 18 to browse and purchase airline tickets at the airport through a TTP. In this case, the merchants 20a'-20d' would be airline carriers.

In the above embodiment, in which the user interface (such as the X-terminal 34) and the TTP 22' are located at the same location, a degree of anonymity on the part of the user 18 is lost (as compared to the embodiment in which the TTP is remote from the user interface). In addition, any visual devices 50 provided on site will not be viewable and thus would have no effect on those users accessing the TTP from remote points in the network 12. However, the advantage of anonymity remains with respect to those observers not physically present at the physical location of the machine 28.

Figure 3:
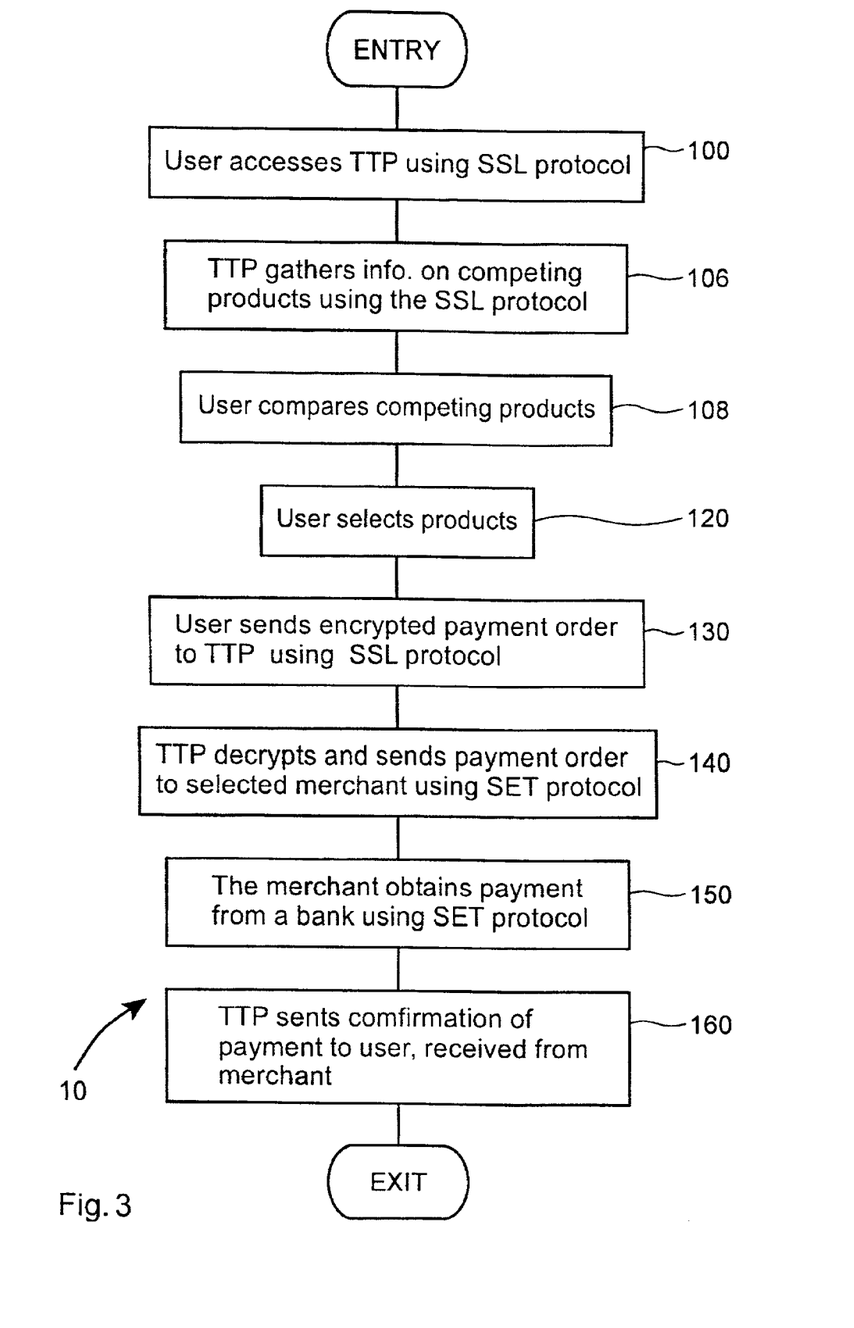
FIG. 3 is a flow chart of the method of the invention.

Referring now to FIGS. 1 and 3, the computerized method of the invention includes the following steps.

In an accessing step 100, the method enables the user 18, preferably using a JAVA-enabled browser 102 (shown in FIG. 1) and a low resource-intensive secure communication protocol (i.e., a secure communications protocol demanding lesser computer resources than SET), such as SSL, to access the TTP 22 in order to request broker services (JAVA is a trademark, registered to Sun Microsystems, which identifies a programming language designed for creating small program objects for operation in a distributed environment such as the Internet 12). In this step 100, where the JAVA programming language is used, a JAVA applet, running on the user's machine, sends the user's request to the TTP 22 (a JAVA applet is a proprietary application program which is usually built into the JAVA programming language). Some of the built-in writing and drawing applets that come with WINDOWS (trademark of Microsoft Corporation) may also be used together with or in lieu of a JAVA applet. Further, other Internet technologies may substitute for these proprietary programs, but standardization of Internet communication makes these programs the practical choice.

In an information gathering step 106, the TTP 22 gathers information from web servers of the merchants 20a-20d which offer competitive products which the TTP believes may satisfy the request of the user 18. Any gathering process may be used. For example, the TTP 22 may access its own database in which the TTP maintains information about all merchants.

Figure 5:
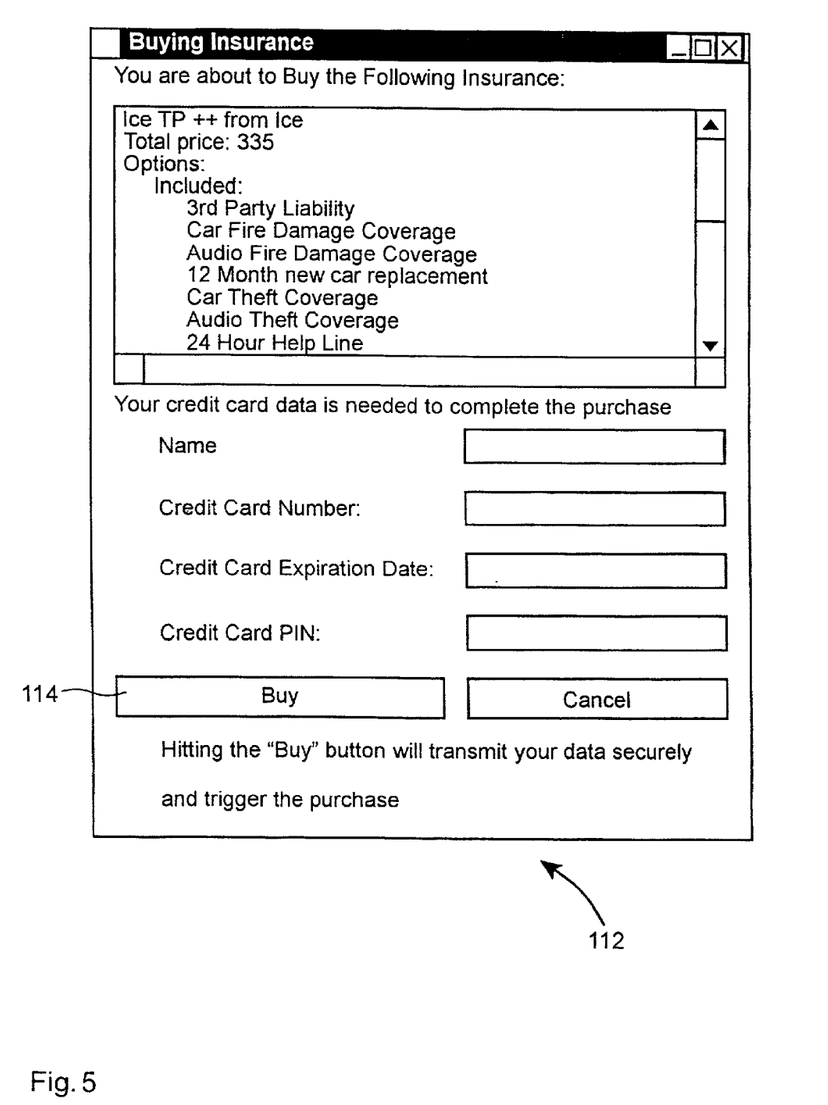
FIG. 5 is a layout view of a second interactive user interface used in the method of the invention.

In a comparing step 108, the browser 102 presents interactive windows or applets 110 and 112, shown in FIGS. 4 and 5, respectively, to the user 18 which allows the user to compare differences between the products offered by competing merchants 20a-20d and choose between the competitive products. The applet 110 allows the user 18 to contrast differences between similar products offered by the competing merchants 20a-20d and choose the most suitable for his or her requirements. The applet 112 also offers a "pay" function 114. These features are obtained through the use of Common Gateway Interface or "CGI" technology, a protocol for dynamic content on the Internet, to dynamically create HTML pages. CGI technology is well known in the art as a means which allows the creation of web pages on demand while the user 18 is on-line, the creation of such pages being based on information from buttons, checkboxes, text inputs, and other user inputs. These CGI dynamically-created pages can constitute images, sounds, text and almost anything other visual or audio device which can be transferred through the Internet 12. Such dynamically created pages may also reference other web pages via hypertext. The clicking on this hypertext by the user 18 may generate a frame with the applet displaying a graphic sourced from the server of a particular merchant 20a-20d.

In a selecting step 120, the user 18 chooses between the competitive products, thus selecting a merchant 20d.

In a first payment step 130, the user 18 activates the "pay" function 114, thus issuing a payment order to the TTP 22. The "pay" function 114 is a part of an interactive window graphical interface or applet 112. The payment is performed using the applet 112 running on the user's machine which sends the user's sensitive financial information, encrypted with the SSL protocol using the encryption key of the TTP 22, to the TTP. Because the TTP 22 is a Trusted Third Party, this should present minimal security risk to the user. For example, a payment order form may be created using CGI technology and such may be sent as an applet to the TTP 22.

In a second payment step 140, the TTP 22 decrypts the payment information and transmits the payment order to the merchant 20d using a highly secure payment protocol, thus paying the merchant on behalf of the user 18. This transmission of credit card information is preferably "tunneled" via a tunnel 134 (shown in FIG. 1) to the server of the merchant 20d offering the selected products. "Tunneling" is yet another security protocol which allows the use of the Internet 12 as part of a private secure network, thus creating a virtual private network over the Internet using public lines. This helps eliminate the need of leasing lines for wide-area communication by permitting secure use of public networks. This part of the transaction takes place using the SET protocol.

In a third payment step 150, the merchant 20d and an associated bank 26 cooperate, again using the SET protocol, to enable the merchant to receive payments from the bank. In order to perform a SET payment, the TTP 22 encrypts the user's credit card information with the bank's public key. In this way, the merchant 20d cannot see any financial details about the user 18—only the bank 26 can decrypt this information. In addition, the TTP 22 verifies the merchant's certificate (identity) of the merchant 20d and sends its own certificate in the payment order. This payment order is encrypted with the merchant's public key, and therefore, no messages are sent in plain over the network 12. The merchant 20d then decrypts the message and sends the encrypted credit card information to the bank 26. The bank 26 processes the payment order, and issues a positive authorization for payment only if the balance on the bank account of the user 18 allows the payment.

In another feature of the invention, the computerized method 10 includes the additional step 160 of providing confirmation of payment on the payment order to the user 18 prior to delivery of the product purchased. In this step, the merchant 20d returns a message to the TTP 22 indicating whether or not the payment was successful. The TTP 22 then transmits this information to the user 18. When the payment is successful, this message can be used to prove legal liabilities, i.e., it can be considered as the receipt of the purchase. This receipt, once signed by all parties involved in the transaction, can be used as evidence in resolving the dissatisfaction of the user 18 with respect to the service received, thus helping guarantee a fair exchange in the electronic 10 transaction. The TTP 22 is now able to return a detailed report to the user 18 about the transaction via the browser 102.

For the purposes of this application, the descriptive phrase "highly secure payment protocol" is any protocol for which the level of security in making a payment is higher than that provided by a communications protocol used to send payment information between the user 18 and the TTP 22. The preferred highly secure payment protocol is the SET protocol which provides authentication for each participant and is specifically designed to handle payments-only information such as credit card information. The descriptive phrase "low resource-intensive protocol" refers to any protocol which requires less computer resources than the highly secure payment protocol. The preferred low resource-intensive protocol is the SSL protocol. In addition, for the purposes of this application, "secure" means that the protocol ensures (1) integrity, in that no one can undetectably change the contents of the message, and (2) confidentiality, in that no one can read the content of a message unless it is included in the actual address of the recipient.

Figure 6A:
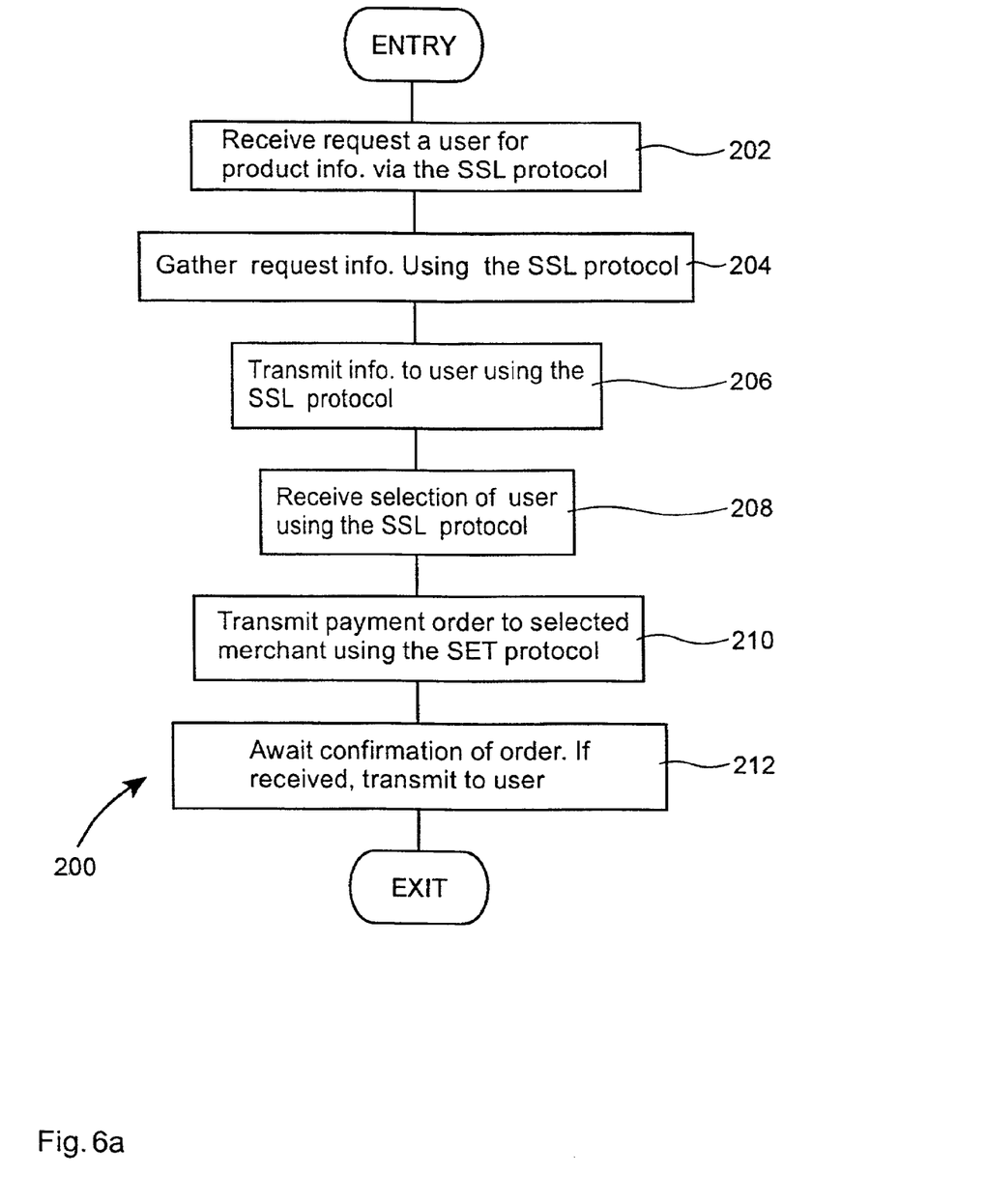
FIGS. 6a-6c are flow charts of the three submethods of the invention.
Figure 6B:
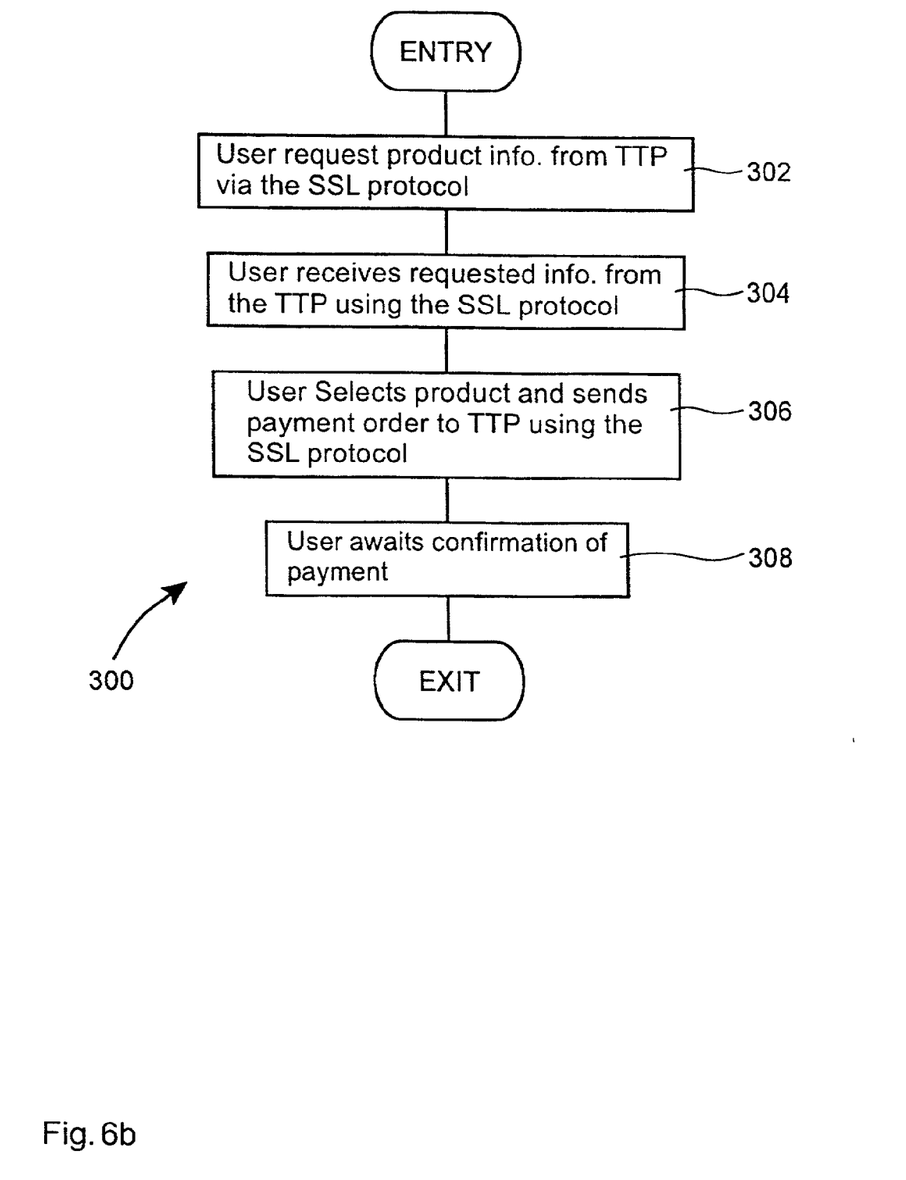
Figure 6C:
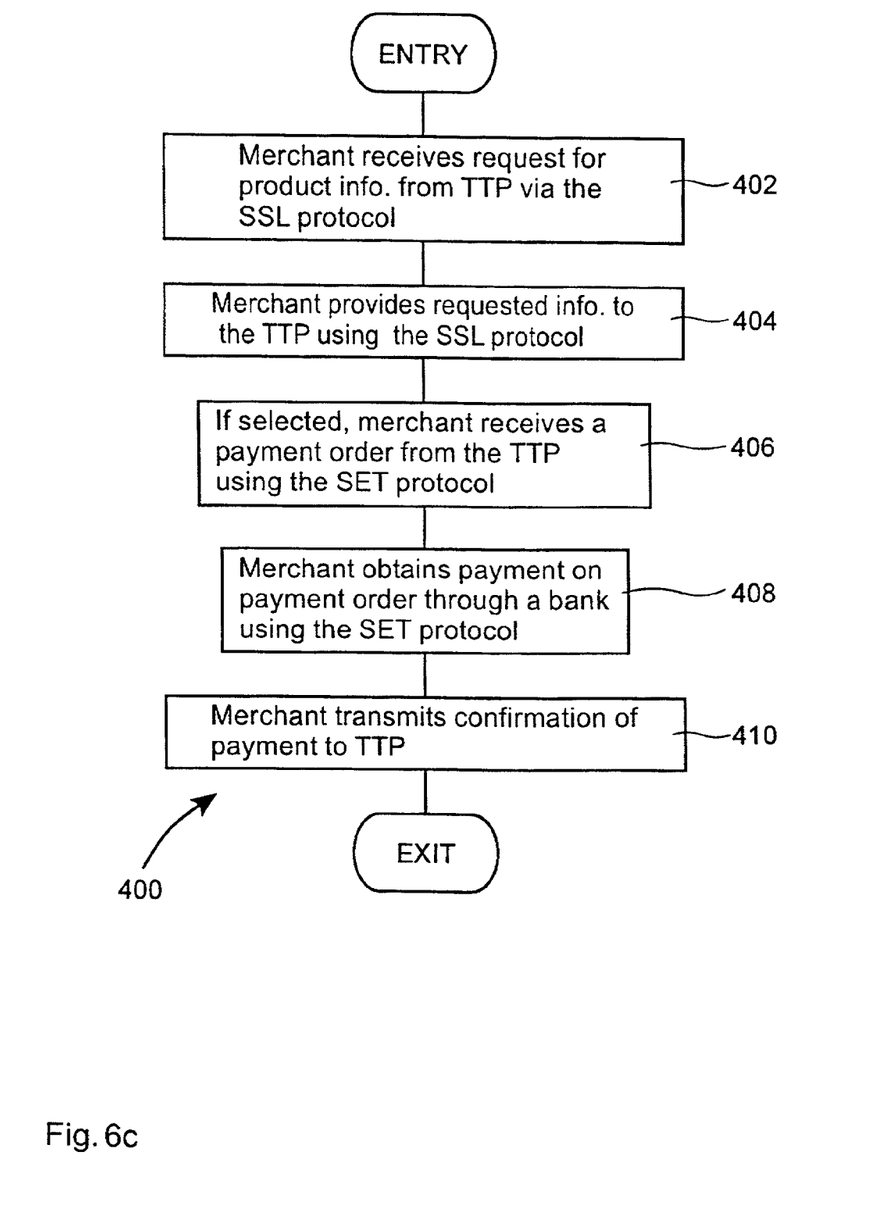

The method 10 is enabled through the application of three submethods 200, 300, and 400, each of which controls the interactions of the method on one end of a particular network link 14 or 24 (i.e., from the perspective of either the TTP 22, the user 18, or the merchants 20a-20d).

Referring now to FIG. 6a, the first submethod 200 controls the interactions between the TTP 22 and the user 18 and between the TTP and the merchants 20a-20d. This first submethod 200 enables the TTP 22, interfacing with a user 18 on an insecure network 12, to offer the user the ability to browse, compare, and purchase using secure payment facilities irrespective of the level of security in communications between the user and the TTP. This submethod 200 includes the following steps. In step 202, using a low resource-intensive secure communication protocol, the TTP 22 receives a request of a user 18 for information concerning products of interest. In step 204, the TTP 22 gathers the requested information from the merchants 20a-20d. In step 206, the TTP 22 transmits this requested information to the user 18 via an interactive window 110. In step 208, the user 18 selects a product offered by a merchant 20d and generates a payment order which the TTP 22 receives. In step 210, using a highly secure payment protocol, the TTP 22 transmits the payment order to the selected merchant 20d who may then receive payment thereon, and, subsequently, transmit confirmation of the payment to the TTP. In step 212, the TTP 22 transmits confirmation of payment to the user 18.

Referring now to FIG. 6b, the second submethod 300 enables a user 18 to browse, compare, and purchase products offered by merchants 20a-20d using secure payment facilities irrespective of the available level of security in communications between the user and the merchants. The second submethod 300 includes the following steps. In step 302, the user 18 uses a low resource-intensive secure communication protocol to transmit requests for information concerning the products of interest provided by the merchants 20a-20d to the TTP 22. The TTP 22, in turn, accesses this information from the corresponding merchants 20a-20d using the SSL protocol. In step 304, the user 18 receives such requested information via an interactive window 110 (shown in FIG. 4) configured by the TTP 22. In step 306, the user 18 selects a product offered by a merchant 20d and creates a payment order which is transmitted to the merchant by the TTP 22 using a highly secure payment protocol. The selected merchant 20d receives payment corresponding to the payment order. In step 308, the user 18 awaits and receives confirmation of payment from the selected merchant 20d or the TTP 22.

Referring now to FIG. 6c, the third submethod 400 enables a merchant 20d to offer products in a forum in which users 18 may browse, compare features of the merchant's products with products offered by other merchants 20a-20c and purchase such products using secure payment facilities, irrespective of the security in communications between the user and the merchant. The third submethod 400 includes the following steps. In step 402, a merchant 20a, 20b, 20c, or 20d receives a request from the TTP 22 for product information. In step 404, a merchant 20a, 20b, 20c, or 20d provides product information through an interactive window 110 (shown in FIG. 4) over a network 12 to the TTP 22. In step 406, using a highly secure payment protocol, a selected merchant 20d receives a payment order from the user 18 through the TTP 22. In step 408, using a highly secure payment protocol, the merchant 20d obtains payment on the payment order. In step 410, the merchant 20d transmits confirmation of receipt of payment to the TTP 22 who may in turn provide confirmation to the user 18.

The computerized method of the invention is encoded in computer-readable media which operates on, in, and between the servers of the merchants 20a-20d, the server of the TTP 22 and the PC of the user 18 over network lines 14 and 24. The submethods 200, 300, and 400 described above are encoded in computer-readable media which control a PC, the CPU of an X-terminal 34 or its associated server or host computer such that the appropriate interfaces are generated which facilitate the reception of inputs, and such that outputs are encrypted, reformatted in a form which the recipient can receive, and transmitted in such form.

An object of the invention is to provide support for fair exchange and anonymity of the user 18 with respect to the selected merchant 20d.

Another object of the invention is to provide an efficient and secure means of permitting electronic commerce on products which traditionally have not been available electronically, such as insurance services.

Another object of the invention is to provide a means for a user 18 of hand-held devices such as Personal Digital Assistants ("PDAs"), mobile phones, and pocket computers to use such devices to more securely transact electronic commerce. This is possible because, although hand-held devices generally have insufficient processing power to utilize the SET protocol, many such devices have sufficient processing power to effectively use the SSL protocol. The SSL protocol provides adequate security when connecting with the server of the TTP 22. As mentioned above, allowing the TTP 22 to handle the details of the transaction, including payment, using the SET protocol, allows the TTP to act as a proxy for the user 18, thus significantly improving security in conducting the transaction (as compared with merely connecting directly with merchants 20a-20d using the SSL protocol). Thus, another object of the invention is to permit the transaction of electronic commerce with maximum security (given computer resources) within a commercially acceptable time frame (i.e., short enough to enable all essential parties involved to realize a net benefit from the transaction).

Multiple variations and modifications are possible in the embodiments of the invention described here. Although certain illustrative embodiments of the invention have been shown and described here, a wide range of modifications, changes, and substitutions is contemplated in the foregoing disclosure. In some instances, some features of the present invention may be employed without a corresponding use of the other features. Accordingly, it is appropriate that the foregoing description be construed broadly and understood as being given by way of illustration and example only, the spirit and scope of the invention being limited only by the appended claims.

INDUSTRIAL APPLICABILITY

A novel and effective method 10 of integrating three security concepts, namely that of a Trusted Third Party, and the SSL and SET protocols is described which allows a user 18 to browse and purchase with a high level of security and anonymity while requiring a minimum set of computer resources of the user, thus permitting the user to participate in electronic commerce using simple hand-held devices such as PDAs, mobile phones, or pocket computers. Such method 10 is industrially applicable to machine or machine-run processes which apply such protocols in the context of commercial electronic transactions.

The invention claimed is:

1. A method comprising:

receiving, at a certified trusted third party, one or more requests for product of one or more merchants from one or more user computing devices utilizing a first network link between the one or more user computing devices and the certified trusted third party, wherein the first network link utilizes a communication protocol, and wherein the one or more requests for product comprise one or more requests for product information and product order information; and providing a secure payment option to users of the one or more user computing devices, wherein the secure payment option comprises:

transmitting one or more order requests from the certified trusted third party to the one or more merchants utilizing a second network link between the certified trusted third party and the one or more merchants, the one or more order requests from the certified trusted third party to one or more merchants corresponding to the one or more requests for product from the one or more user computing devices; and processing payment with one the one or more merchants utilizing the second network link utilizing a payment protocol which is more secure than the communication protocol;

wherein the user communicates only with the certified trusted third party on the first network link to complete an entire transaction.

2. The method of claim 1, wherein a server of the certified trusted third party, which is built into a housing including a terminal interface, is configured to process one or more requests from the one or more user computing devices to select and purchase products of one or more merchant companies at one or more remote sites.

3. The method of claim 1, further comprising providing confirmation of payment to the one or more user computing devices.

4. The method of claim 1, wherein the communication protocol is an SSL protocol, and the payment protocol is an SET protocol.

5. A method comprising:

presenting a user with an interface on an electronic device from which the user can send on a first network link utilizing a communication protocol one or more requests to a certified trusted third party for information concerning one or more products of one or more merchants, wherein the information concerning one or more products comprises product information and product order information;

receiving, on the first network link, information corresponding to the one or more requests;

presenting the information to the user via an interactive window; and providing a secure payment option to the user, wherein the secure payment option comprises:

sending a user payment order to the certified trusted third party in response to user selection of a product offered by a merchant; and receiving confirmation of payment from the certified trusted third party;

wherein the user communicates only with the certified trusted third party on the first network link to complete an entire transaction.

6. The computerized method of claim 5 wherein the interface includes a browser which is JAVA-enabled, and the interactive window is an applet.

7. The computerized method of claim 5 wherein the communication protocol is an SSL protocol.

8. The method according to claim 1, wherein the one or more user computing devices comprise one or more of a personal digital assistant, a mobile phone, and a hand-held computer.

9. The method according to claim 1, wherein the certified trusted third party comprises a server configured to implement a SET payment protocol.

10. The method according to claim 1, wherein:
the certified trusted third party displays a unique identifying icon registered with a certification authority; and
the one or more merchants are not trusted or certificated.

11. A computer-readable non-transitory storage medium encoded with a program of instructions configured to control a central processing unit to perform steps, the steps comprising:

receiving, at a certified trusted third party, one or more requests for product of one or more merchants from one or more user computing devices utilizing a first network link between the one or more user computing devices and the certified trusted third party, wherein the first network link utilizes a communication protocol, and wherein the one or more requests for product comprise one or more requests for product information and product order information; and providing a secure payment option to users of the one or more user computing devices, wherein the secure payment option comprises:

transmitting one or more order requests from the certified trusted third party to the one or more merchants utilizing a second network link between the certified trusted third party and the one or more merchants, the one or more order requests from the certified trusted third party to one or more merchants corresponding to the one or more requests for product from the one or more user computing devices; and processing payment with one the one or more merchants utilizing the second network link utilizing a payment protocol which is more secure than the communication protocol;

wherein the user communicates only with the certified trusted third party on the first network link to complete an entire transaction.

12. An apparatus comprising:
a server comprising a central processing unit; and
a computer-readable medium encoded with program instructions for controlling the central processing unit to perform steps, the steps comprising:
receiving, at the apparatus, one or more requests for product of one or more merchants from one or more users, wherein the one or more requests for product comprise one or more requests for product information and product order information; and providing a secure payment option to the one or more users, wherein the secure payment option comprises:

transmitting one or more order requests from the apparatus to the one or more merchants, the one or more order requests from the apparatus to one or more merchants corresponding to the one or more requests for product from the one or more user computing devices; and processing payment with one the one or more merchants utilizing a payment protocol which is highly secure;

wherein only the apparatus accesses an identity of one or more users.

13. The apparatus of claim 12, wherein the apparatus is a resident local machine with which the one or more users directly and physically interface comprising:
a keyboard; and
a card reader configured to receive and process payments made with a bank or smart card.

14. The apparatus of claim 13, wherein receiving, at the apparatus, one or more requests for product of one or more merchants from one or more users further comprises:
receiving keyboard input.

15. The apparatus of claim 12, wherein processing payment with one the one or more merchants utilizing a payment protocol which is highly secure further comprises utilizing a SET payment protocol.

16. The apparatus of claim 12, wherein the one or more requests for product further comprise one or more requests for insurance services.

17. A computer-readable non-transitory storage medium encoded with steps for securely transacting electronic commerce, said steps comprising:

receiving at a certified trusted third party one or more requests for product information regarding products of one or more merchants, said one or more requests for product information being sent from one or more user computing devices utilizing a first network link, wherein the first network link utilizes a communication protocol;

providing product information including product order information to the one or more user computing devices utilizing the first network link;

receiving one or more product orders from the one or more user computing devices utilizing the first network link;

providing a secure payment option to users of the one or more user computing devices, wherein the secure payment option comprises:

transmitting one or more order requests from the certified trusted third party to the one or more merchants utilizing a second network link between the certified trusted third party and the one or more merchants; and processing payment with one the one or more merchants utilizing the second network link utilizing a payment protocol which is more secure than the communication protocol;

wherein the user communicates only with the certified trusted third party on the first network link to complete an entire transaction.

* * * * *